US012758989B1

(12) United States Patent
Yan

(10) Patent No.: US 12,758,989 B1
(45) Date of Patent: Oct. 13, 2026

(54) SHOWER ADJUSTMENT STRUCTURE

(71) Applicant: Xiamen Galenpoo Kitchen & Bathroom Technology Co., Ltd., Xiamen (CN)

(72) Inventor: Xiaoling Yan, Xiamen (CN)

(73) Assignee: Xiamen Galenpoo Kitchen & Bathroom Technology Co., Ltd., Xiamen (CN)

(*) Notice: Subject to any disclaimer, the term of this patent is extended or adjusted under 35 U.S.C. 154(b) by 0 days.

(21) Appl. No.: 19/538,954

(22) Filed: Feb. 12, 2026

(30) Foreign Application Priority Data

Feb. 4, 2026 (CN) ......................... 202610160568.2

(51) Int. Cl.
*B05B 1/18* (2006.01)
*E03C 1/04* (2006.01)

(52) U.S. Cl.
CPC .............. *B05B 1/18* (2013.01); *E03C 1/0408* (2013.01); *Y10T 137/9464* (2015.04)

(58) Field of Classification Search
CPC ......... B05B 1/18; E03C 1/066; E03C 1/0415; E03C 1/0414; E03C 1/0417; E03C 1/0404; Y10T 137/9464
USPC .......................................................... 137/801
See application file for complete search history.

(56) References Cited

U.S. PATENT DOCUMENTS

| | | | | |
|---|---|---|---|---|
| 2,685,093 | A * | 8/1954 | Lundquist | E03C 1/066 4/615 |
| 4,360,159 | A * | 11/1982 | Haynes | E03C 1/066 4/596 |
| 5,974,604 | A * | 11/1999 | Barnea | E03C 1/06 4/615 |
| 8,683,624 | B1 * | 4/2014 | Zhadanov | E03C 1/025 4/615 |
| 10,822,778 | B1 | 11/2020 | Ling et al. | |
| 12,523,022 | B2 * | 1/2026 | Wu | E03C 1/0408 |
| 2005/0081288 | A1 * | 4/2005 | Leung | E03C 1/06 4/567 |
| 2015/0136245 | A1 * | 5/2015 | Hong | E03C 1/06 137/356 |
| 2020/0197971 | A1 * | 6/2020 | Winter | B05B 15/656 |

* cited by examiner

*Primary Examiner* — Daphne M Barry
(74) *Attorney, Agent, or Firm* — JEEN IP LAW, LLC

(57) ABSTRACT

The present invention discloses a shower adjustment structure that keeps the water outlet direction within a predetermined range at all times, enables rapid adjustment for more convenient operation, and is foldable to reduce occupied space. The structure includes a slide rod, a water inlet device, a first structural member, a second structural member and an operating member. A guide portion is arranged on the slide rod, and the water inlet device is mounted on the slide rod. Two ends of the first structural member are pivotally fitted to the water inlet device and the second structural member respectively. The operating member is pivotally fitted to the second structural member and mounted on the slide rod through guiding fit, with its motion trajectory constrained by the guide portion. Under external force, the operating member changes its posture relative to the guide portion to undo its locked state with the guide portion.

10 Claims, 10 Drawing Sheets

SHOWER ADJUSTMENT STRUCTURE

RELATED APPLICATIONS

The present patent document claims the benefit of priority to Patent Application No. 202610160568.2, filed Feb. 4, 2026, and entitled "SHOWER ADJUSTMENT STRUCTURE," the entire contents of each of which are incorporated herein by reference.

BACKGROUND

1. Technical Field

The present invention belongs to the technical field of bathroom equipment, and particularly relates to a shower adjustment structure.

2. Background Information

In shower equipment, there are solutions for adjusting the mounting height of the overhead shower through a lifting rod or telescopic rod, which can better accommodate the personalized needs of users of different heights for water outlet height, thereby enhancing comfort and convenience in use. Moreover, the overhead shower is typically equipped with a ball joint connection structure, enabling users to adjust the water outlet angle within a certain range by rotating or swinging, thereby further increasing flexibility during use.

However, a mechanical structure using a lifting rod or telescopic rod presents certain operational complexities in practice. For groups such as the elderly or children, the structure may be cumbersome or the operating steps may be complicated, resulting in difficulty in adjustment, inconvenience in use, or even potential safety hazards.

Furthermore, if the overhead shower relies solely on the ball joint structure to adjust the water outlet direction, its adjustable angle and direction are still significantly limited, making it difficult to achieve wider or more flexible angle customization, which to some extent affects the overall improvement of the shower experience.

BRIEF SUMMARY

A main objective of the present invention is to provide a shower adjustment structure to solve the problems existing in the prior art, enabling quick adjustment and easier operation.

To achieve the above objective, the solution of the present invention is as follows:

A shower adjustment structure includes a slide rod, a water inlet device, a first structural member, a second structural member, and an operating member. A guide portion is provided on the slide rod. The water inlet device is mounted on the slide rod. Two ends of the first structural member are pivotally fitted to the water inlet device and the second structural member respectively. The operating member is pivotally fitted to the second structural member and mounted on the slide rod by a guiding fit, with its motion trajectory constrained by the guide portion. The operating member undergoes a posture change relative to the guide portion under the action of an external force to undo a locked state relative to the guide portion.

The guide portion is a constraint structure provided with guide rails therein. A middle part of the operating member is provided with protruding portions slidably fitted in the guide rails. The protruding portion is fitted to two side walls of the guide rail.

An elastic mechanism is disposed between a lower part of the operating member and a bottom wall of the guide portion, to lock the operating member when no external force is applied.

Preferably, a surface of an upper part of the operating member facing the guide portion is provided with anti-slip strips.

Preferably, P the lower part of the operating member extends away from the guide portion to form an operating portion.

Preferably, a surface of the lower part of the operating member facing the bottom wall of the guide portion is provided with a mounting groove, and a mounting post is provided in the mounting groove. A movable sleeve and a spring for driving the movable sleeve to extend out of the mounting groove are slidably sleeved on the mounting post, and an end portion of the mounting post is connected with a locking piece for locking the movable sleeve.

Preferably, an end surface of the movable sleeve facing the bottom wall of the guide portion is provided with a plurality of protrusions.

At least part of the second structural member forms a water outlet panel, or the second structural member is configured to mount and communicate a water outlet device.

Preferably, a first water diversion chamber is provided in the water inlet device. A first water passage chamber is provided in the first structural member. A second water passage chamber is provided in the second structural member. The first water diversion chamber, the first water passage chamber, and the second water passage chamber are sequentially communicated.

Preferably, an upper end of a front side of the water inlet device is provided with a first rotary shaft portion, and the first rotary shaft portion is in communication with the first water diversion chamber. Upper and lower ends of the first structural member are respectively provided with a second rotary shaft portion and a third rotary shaft portion, and the second rotary shaft portion and the third rotary shaft portion are both in communication with the first water passage chamber. A middle part of a back side of the second structural member is provided with a fourth rotary shaft portion, and an upper end of a front side of the second structural member is provided with a water outlet connector or the water outlet panel. The first rotary shaft portion is rotatably connected with the second rotary shaft portion in a dynamic sealing manner, and the third rotary shaft portion is rotatably connected with the fourth rotary shaft portion in a dynamic sealing manner.

Preferably, a second water diversion chamber, a water inlet chamber, and a water diversion connector are further provided in the water inlet device. The water inlet chamber is in communication with both the first water diversion chamber and the second water diversion chamber and is provided with a switching valve therein, and the switching valve is configured to control communication of the water inlet chamber with the first water diversion chamber and the second water diversion chamber. The water diversion connector is in communication with the second water diversion chamber.

Preferably, the water inlet device is further provided with a water inlet port, and a nut is embedded in the water inlet port. An adapter is sleeved on the water inlet port, and a limiting sleeve for locking the adapter is threadedly fitted in the nut. The adapter and the water inlet device are secured by a hex screw.

After the use of the above technical solution, the following technical effects are achieved by the present invention:

Through the pivotal fit between the first structural member and the second structural member, the water outlet device undergoes both the height change and the posture change during adjustment, so that the water outlet direction always remains within a predetermined range. Thus, at different mounting heights, the water outlet device can effectively cover the user's body, thereby avoiding problems of deviation in water outlet direction and insufficient coverage caused by the height change.

DESCRIPTION OF REFERENCE NUMERALS

Figure 1:
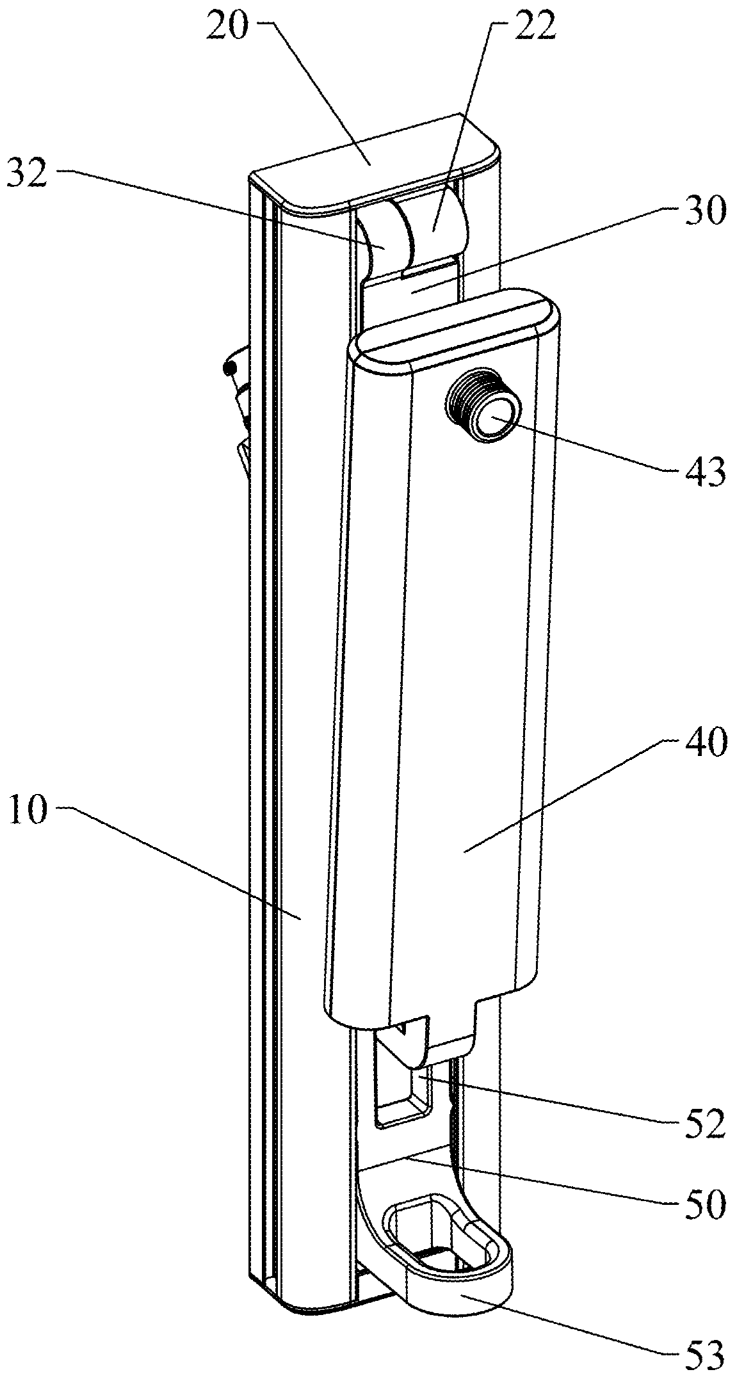
FIG. 1 is an overall three-dimensional view of a first embodiment of the present invention.
Figure 2:
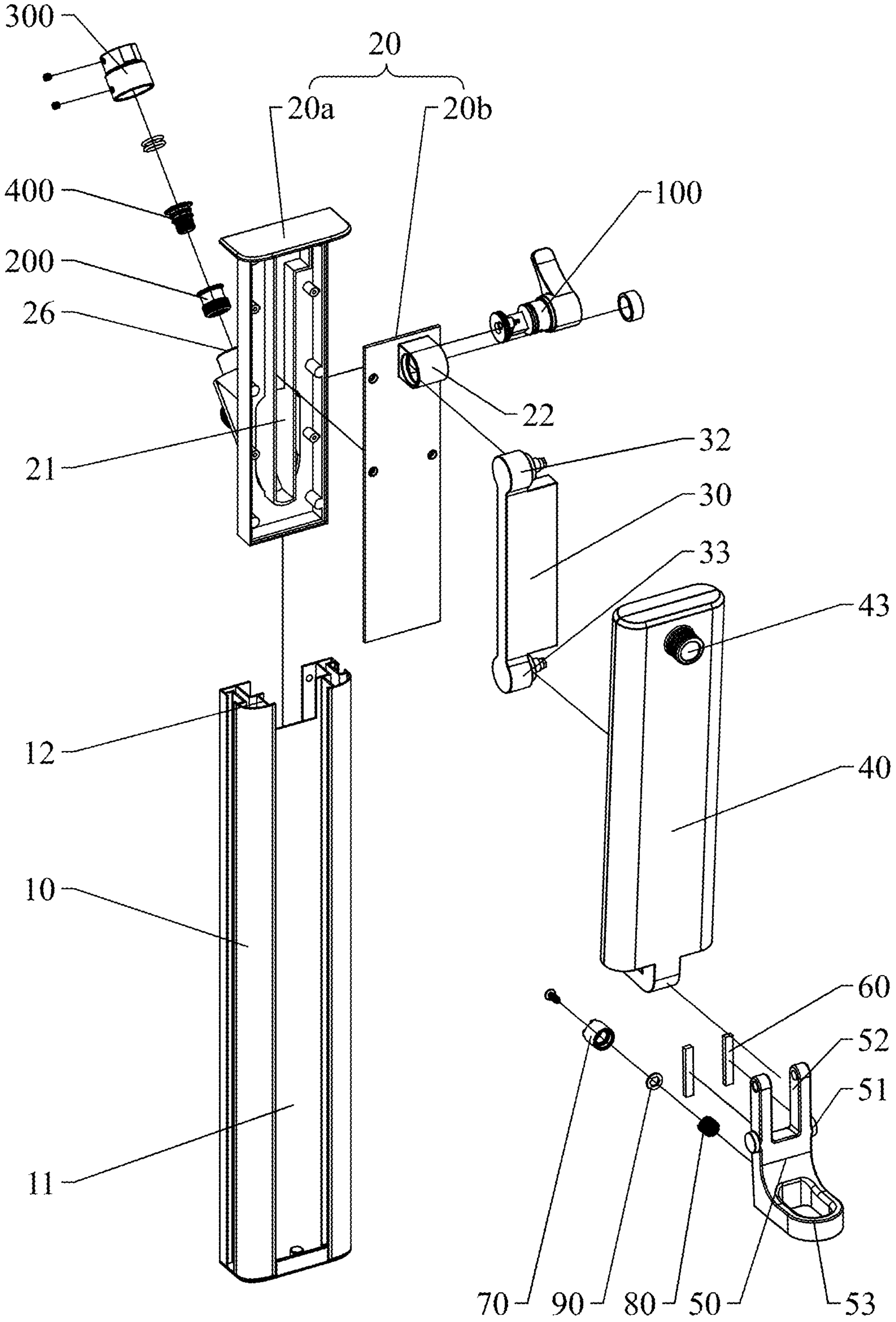
FIG. 2 is an overall exploded view I of the first embodiment of the present invention.
Figure 3:
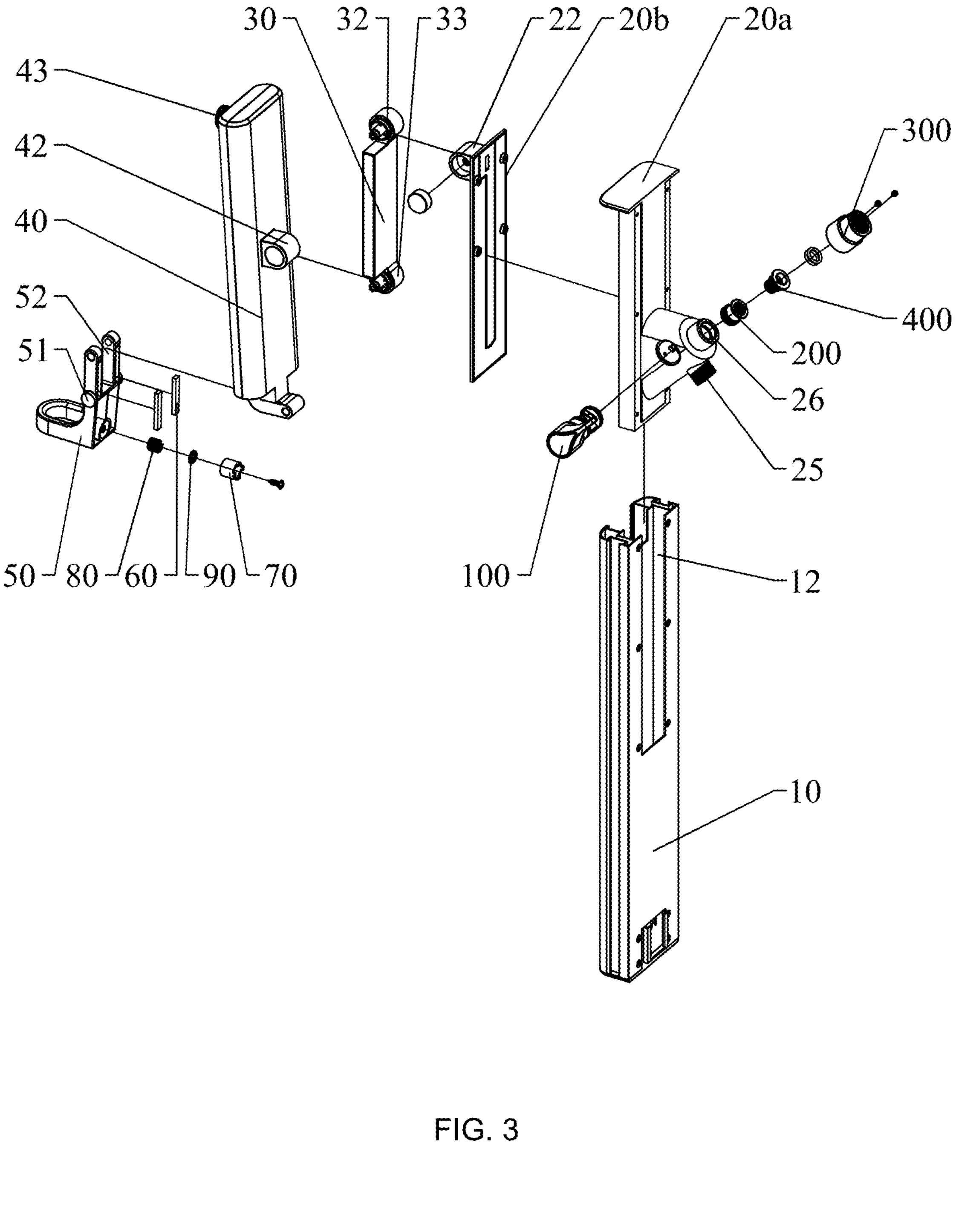
FIG. 3 is an overall exploded view II of the first embodiment of the present invention.
Figure 4:
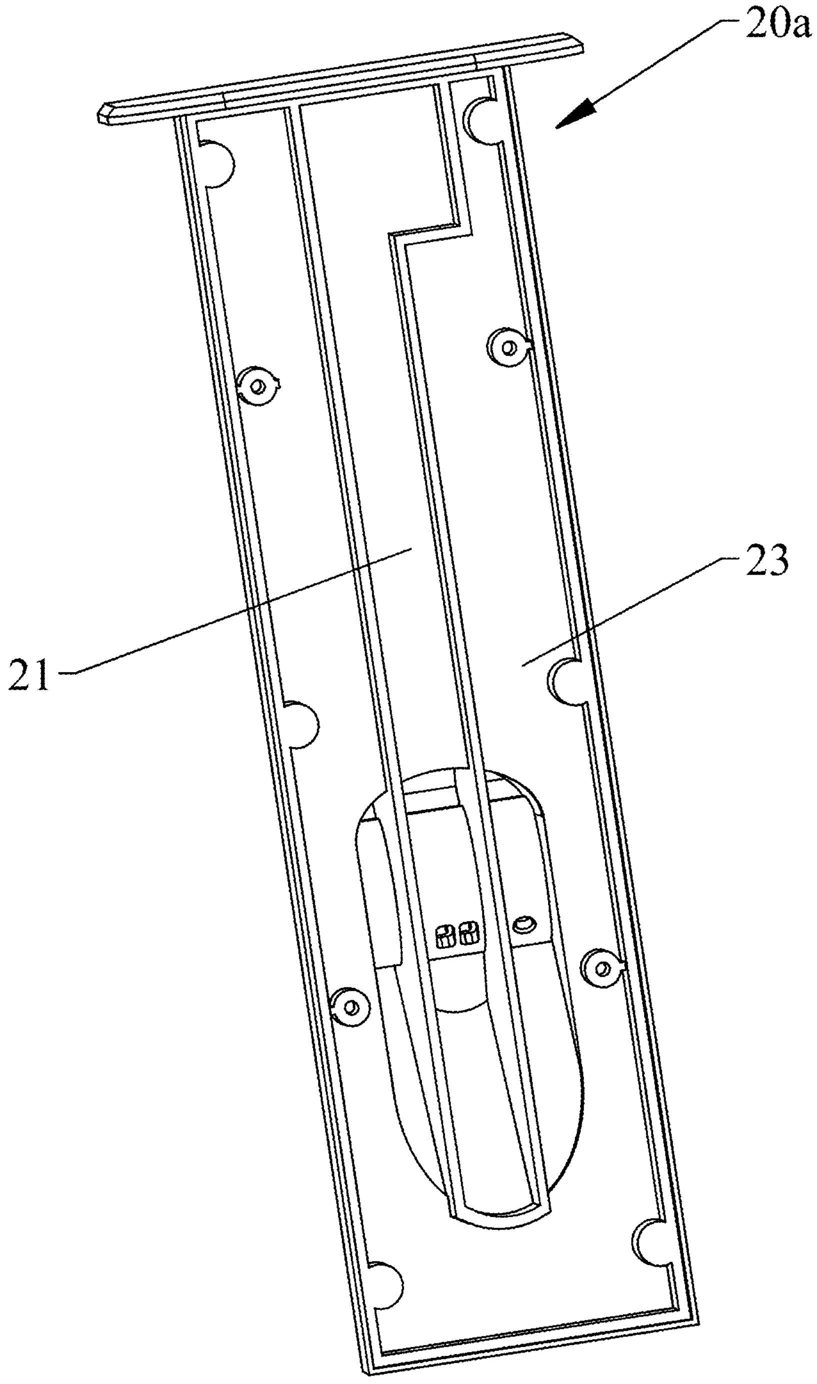
FIG. 4 is a three-dimensional view of a main body of a water inlet device in the first embodiment of the present invention.
Figure 5:
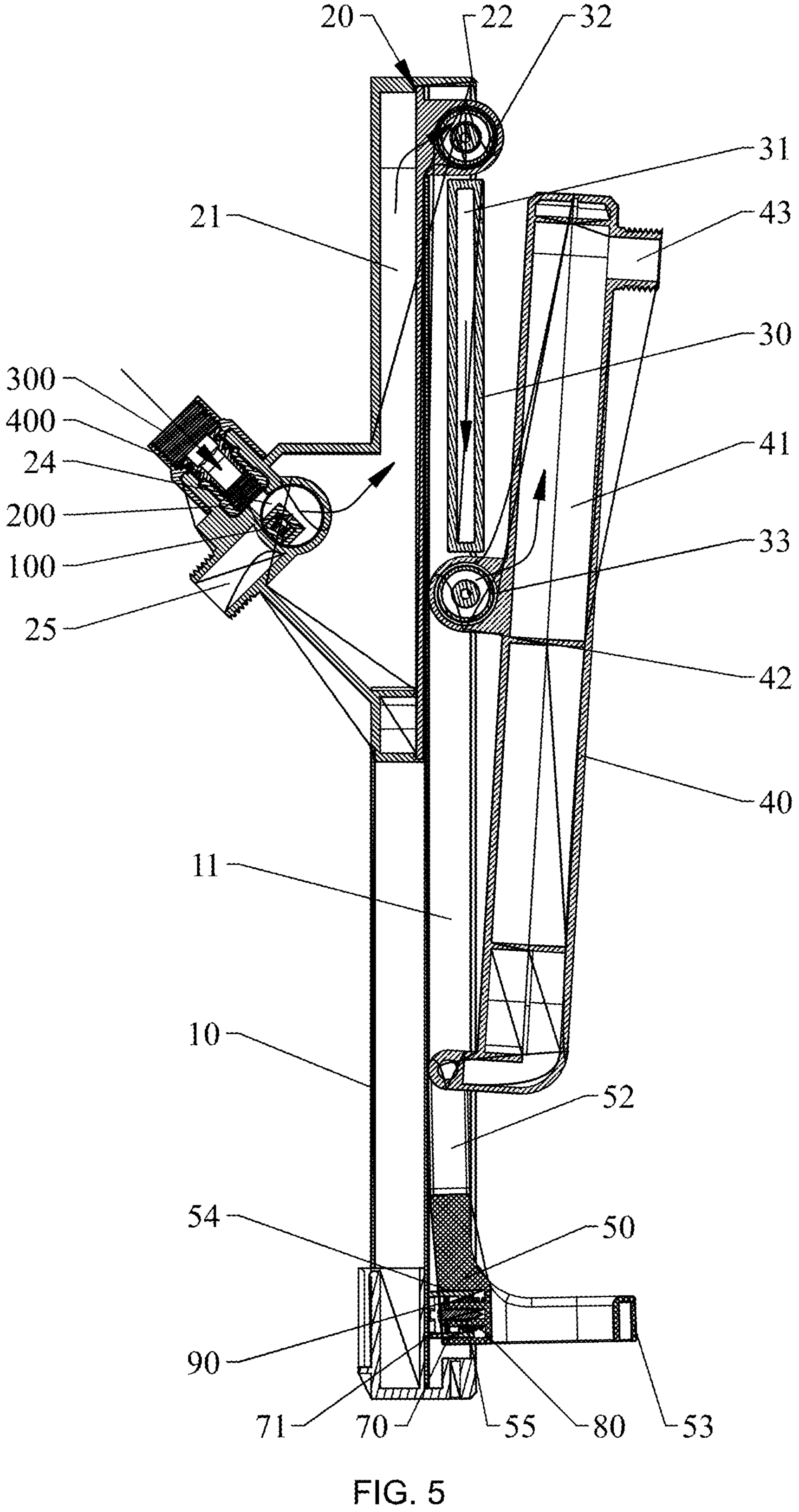
FIG. 5 is a sectional view and schematic water path view of the first embodiment of the present invention.

10—slide rod; 11—guide portion; 12—guide rail; 20—water inlet device; 20*a*—main body; 20*b*—cover plate; 21—first water diversion chamber; 22—first rotary shaft portion; 23—second water diversion chamber; 24—water inlet chamber; 25—water diversion connector; 26—water inlet port; 30—first structural member; 31—first water passage chamber; 32—second rotary shaft portion; 33—third rotary shaft portion; 40—second structural member; 41—second water passage chamber; 42—fourth rotary shaft portion; 43—water outlet connector; 44—water outlet panel; 441—water outlet post; 50—operating member; 51—protruding portion; 52—mounting opening; 53—operating portion; 54—mounting groove; 55—mounting post; 60—anti-slip strip; 70—movable block; 71—protrusion; 80—spring; 90—locking piece; 100—switching valve; 200—nut; 300—adapter; 400—limiting sleeve.

DETAILED DESCRIPTION OF THE DRAWINGS AND THE PRESENTLY PREFERRED EMBODIMENTS

To further explain the technical solution of the present invention, the following provides a detailed description through specific embodiments.

Referring to FIG. 1 to FIG. 10, the present invention discloses a shower adjustment structure, including a slide rod 10, a water inlet device 20, a first structural member 30, a second structural member 40, and an operating member 50.

A guide portion 11 is provided on the slide rod 10, for example, at a front side. The guide portion 11 is a constraint structure, which may be a slide groove or groove-like structure.

The water inlet device 20 is mounted on the slide rod 10 in a detachable manner, such as by screw locking or snap-fit connection, for example, at an upper end of a back side of the slide rod 10.

Two ends of the first structural member 30 are pivotally fitted to the water inlet device 20 and the second structural member 40 respectively.

The operating member 50 is pivotally fitted to the second structural member 40 and mounted on the slide rod 10 by a guiding fit, with its motion trajectory constrained by the guide portion 11. The operating member 50 undergoes a posture change relative to the guide portion 11 under the action of an external force to undo a locked state relative to the guide portion 11.

By adopting the above solution, through the pivotal fit between the first structural member 30 and the second structural member 40, a water outlet device undergoes both the height change and the posture change during adjustment (the resulting water outlet direction change relationship includes but is not limited to the illustrated implementation), so that the water outlet direction always remains within a predetermined range. Thus, at different mounting heights, the water outlet device can effectively cover the user's body, thereby avoiding problems of deviation in water outlet direction and insufficient coverage caused by the height change.

Figure 6:
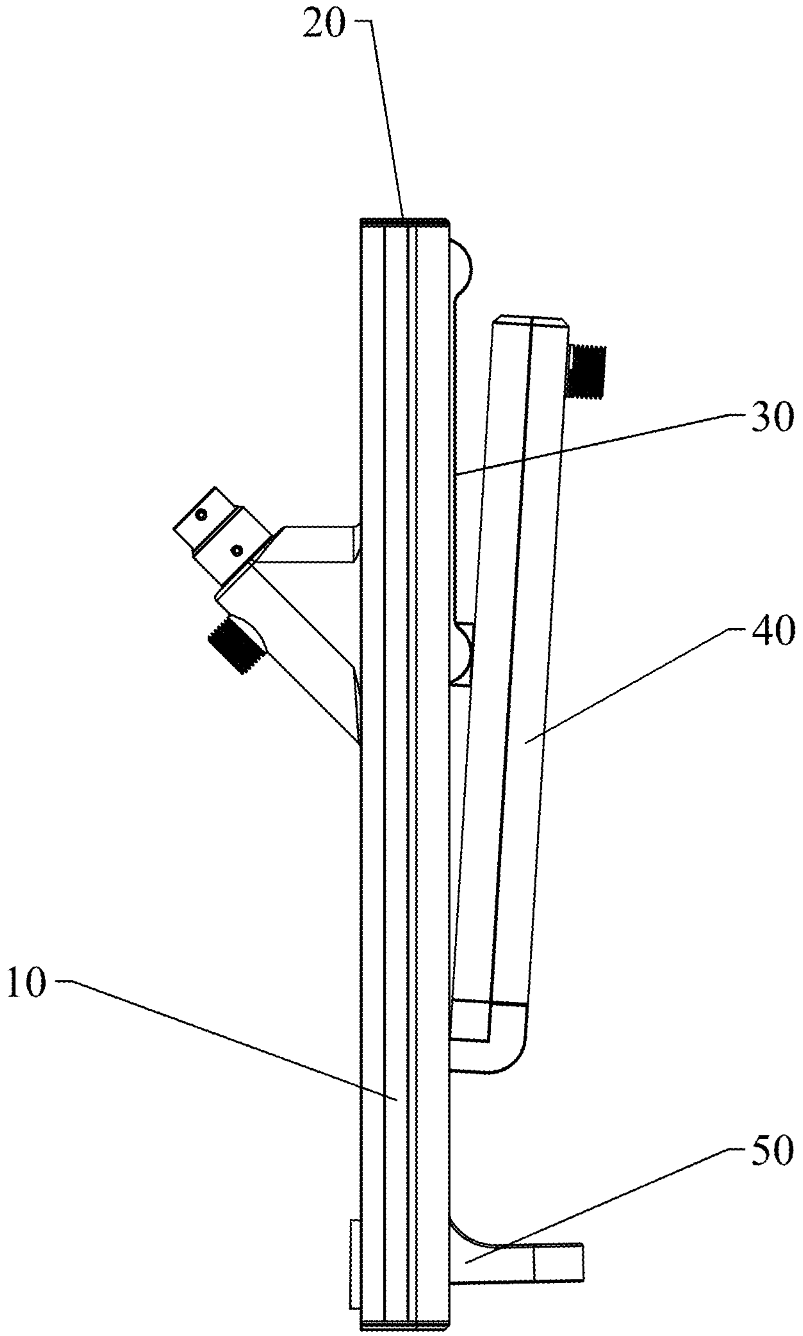
FIG. 6 is a schematic view of state I of the first embodiment of the present invention.
Figure 7:
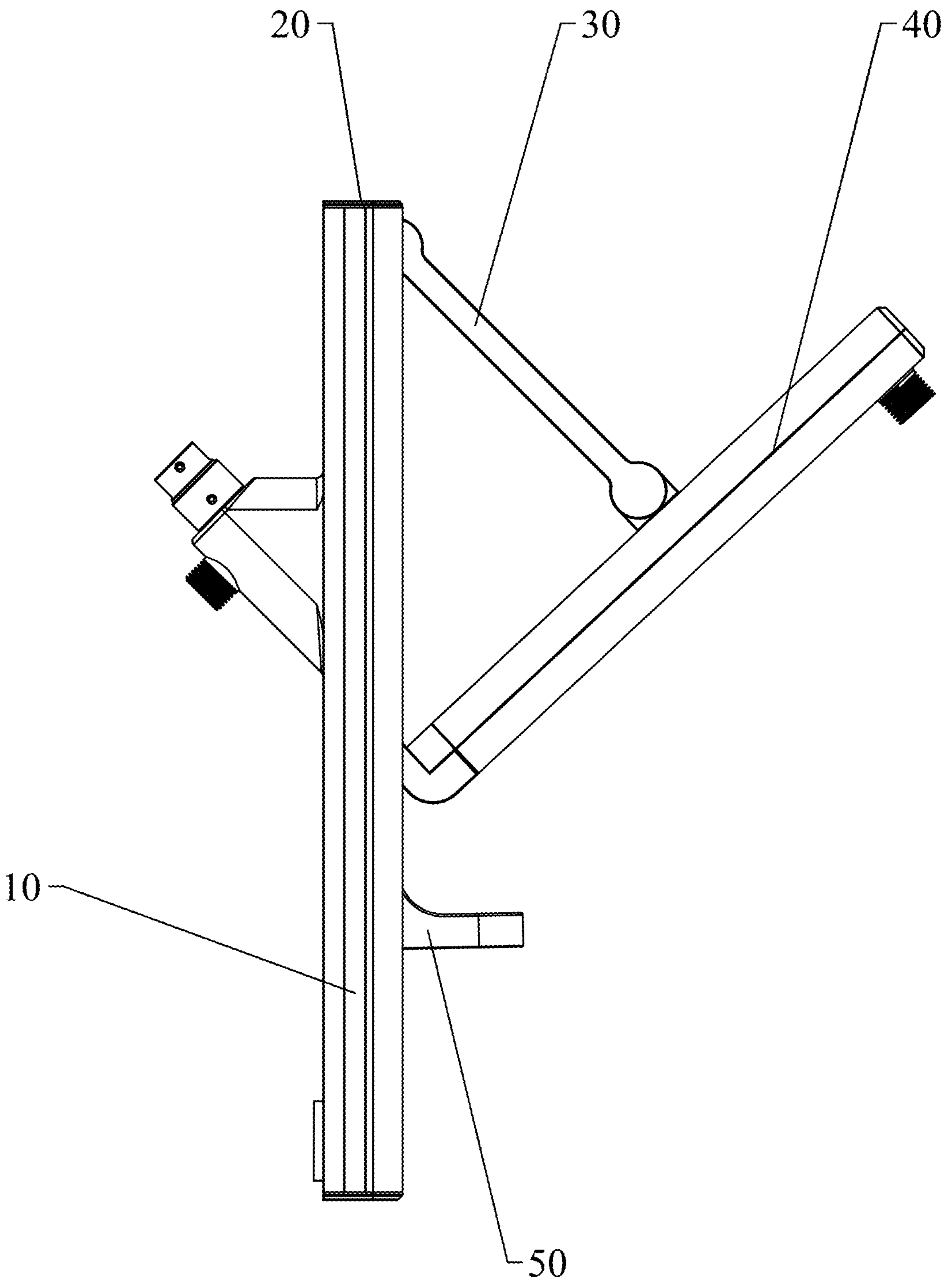
FIG. 7 is a schematic view of state II of the first embodiment of the present invention.
Figure 8:
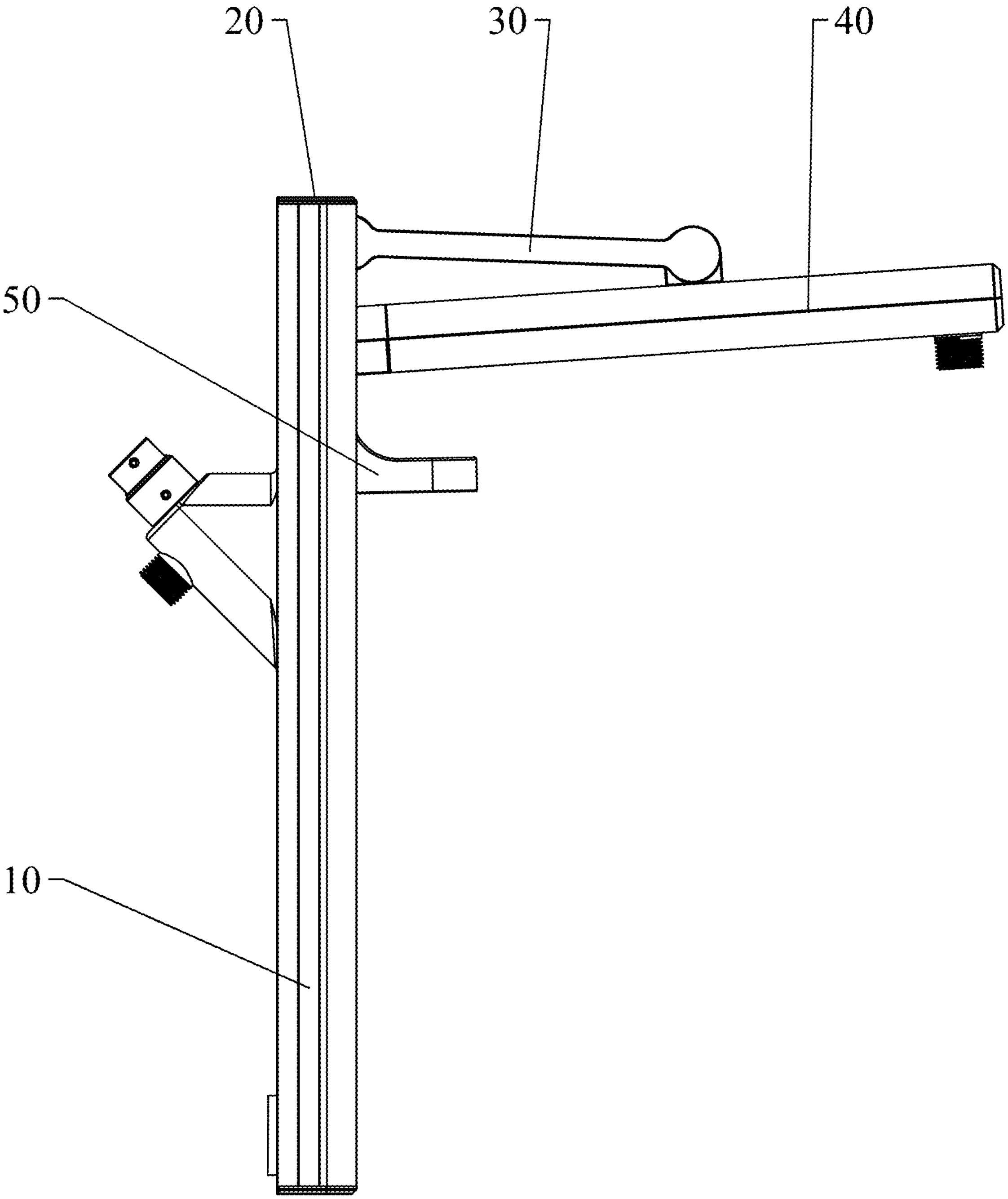
FIG. 8 is a schematic view of state III of the first embodiment of the present invention.

Meanwhile, the slide rod 10, the first structural member 30, and the second structural member 40 form a foldable triangular structure, and the operating member 50 is used for locking, allowing the lower end of the second structural member 40 to be fixed at a certain position in the guide portion 11, thereby realizing the position change caused by the posture change of the second structural member 40. Referring to FIG. 6 to FIG. 8, when the second structural member 40 undergoes an angle change relative to the slide rod 10, both the height of the end away from the operating member 50 and the angle (i.e., posture) of the second structural member 40 change. Compared with conventional adjustment relying solely on a ball joint, the present invention provides a wider water outlet range and a wider angle range.

In addition, since the slide rod 10, the first structural member 30, and the second structural member 40 form the foldable structure through the operating member 50 slidably fitted to the guide portion 11, the first structural member 30 and the second structural member 40 can be easily folded closely against the side of the slide rod 10 when needed, thereby significantly reducing the space occupied by the entire device. This compact folding method effectively reduces the floor area required for storage, optimizes loading efficiency during transportation, and ultimately helps users significantly lower storage management costs and logistics expenses, thereby enhancing the practicality and the economic value of the product.

In some embodiments, the second structural member 40 may be provided with an additional water outlet device to serve as a structural member for mounting the water outlet device, or may be directly designed as a structural member with water outlet functionality. For example, in a first embodiment below, the second structural member 40 may be configured to mount/connect an overhead shower. In a second embodiment below, the second structural member 40 may be designed as an overhead shower with a shower panel.

Referring to FIG. 1 to FIG. 8, the first embodiment of the present invention is shown.

The guide portion 11 is a slide groove, with guide rails 12 provided on two side walls. Two sides of a middle part of the operating member 50 are each provided with a cylindrical protruding portion 51 slidably fitted in the guide rail 12, and the protruding portion 51 is fitted with two side walls of the guide rail 12 to achieve dimensional matching. Thus, the protruding portion 51 can smoothly slide along an extension direction of the guide rail 12. Moreover, the guide rail 12 limits the lateral displacement of the protruding portion 51, ensuring that the operating member 50 always moves along the preset path of the guide portion 11, thereby preventing jamming or deviation during adjustment. Additionally, the protruding portion 51 may also serve as the rotary/swing shaft when the lower part of the operating member 50 is pressed, to realize the corresponding locking/unlocking function.

An elastic mechanism is disposed between a lower part of the operating member 50 and a bottom wall of the guide portion 11, to lock the operating member 50 when no external force is applied, i.e., to provide elastic force so that an upper part of the operating member 50 fits against the bottom wall of the guide portion 11 and forms a damping effect to lock the operating member 50. When the elastic mechanism is provided between the lower part of the operating member 50 and the guide portion 11, the elastic force provided by the elastic mechanism, combined with the transmission and amplification of force, ensures that the upper part of the operating member 50 closely fits against the guide portion 11, thereby utilizing the damping to lock the operating member 50 and fix the lower end of the second structural member 40 at a certain position of the guide portion 11. Additionally, during height adjustment, it is only required to apply force to the lower part of the operating member 50 to unlock the operating member 50 and move the operating member along the guide portion 11 in the slide rod 10; and upon release, the operating member can be locked again under the action of the elastic mechanism. The whole adjustment process only requires one hand to hold the operating member 50 and complete pressing, sliding, and releasing, and does not need additional tools or complicated operating steps, making the operation simple and labor-saving. The present invention is especially suitable for elderly users, children, and other groups with weaker operational abilities and effectively solves the problem of cumbersome adjustment in the conventional lifting rod structure.

In this embodiment, the upper part of the operating member 50 is provided with a mounting opening 52 for the lower end of the second structural member 40 to be pivotally fitted, so the upper part of the operating member 50 presents a U-shaped structure. Surfaces of two arms of the U-shaped structure facing the bottom wall of the guide portion 11 are provided with anti-slip strips 60. The anti-slip strips 60 may be made of an elastic material with a high coefficient of friction, such as rubber or silicone, and surfaces of the anti-slip strips may be designed with fine serrated or wavy patterns to further increase the damping with the bottom wall of the guide portion 11. The design of such anti-slip strips 60 not only improves the reliability of locking but also reduces wear caused by direct hard contact between the operating member 50 and the bottom wall of the guide portion 11, thereby prolonging the service life of the product.

In this embodiment, the lower part of the operating member 50 extends away from the guide portion 11 to form an operating portion 53. In this embodiment, the operating portion 53 is a ring-shaped structure. During operation, the user only needs to grip the ring-shaped operating portion 53 with fingers to apply pressure to the lower part of the operating member 50, causing the upper part of the operating member 50 to move away from the bottom wall of the guide portion 11, thereby achieving unlocking. This makes the operation more convenient.

In this embodiment, a surface of the lower part of the operating member 50 facing the bottom wall of the guide portion 11 is provided with a mounting groove 54, and a mounting post 55 is provided in the mounting groove 54. A movable sleeve 70 and a spring 80 for driving the movable sleeve 70 to extend out of the mounting groove 54 are slidably sleeved on the mounting post 55, and an end portion of the mounting post 55 is connected with a locking piece 90 for locking the movable sleeve 70 by screw locking. Thus, the spring 80 can provide elastic force to push the movable sleeve 70 out of the mounting groove 54 and drive the operating member 50 to perform a seesaw-like swing motion, so that the upper part (i.e., the aforementioned anti-slip strips 60) of the operating member 50 fits directly against the bottom of the guide portion 11 to achieve the damping effect, thereby ultimately locking the operating member 50. In this embodiment, an end surface of the movable sleeve 70 facing the bottom wall of the guide portion 11 is provided with a plurality of protrusions 71, which can reduce the friction with the bottom wall of the guide portion 11 and avoid jamming due to excessive friction during sliding of the movable sleeve 70 with the operating member 50. Moreover, the point-contact design of the protrusions 71 also reduces wear of the movable sleeve 70 and the bottom wall of the guide portion 11, thereby further improving the stability and service life of the elastic mechanism.

As previously described, the second structural member 40 of the first embodiment may be provided with the water outlet device. Specifically, a first water diversion chamber 21 is provided in the water inlet device 20, a first water passage chamber 31 is provided in the first structural member 30, a second water passage chamber 41 is provided in the second structural member 40, and the first water diversion chamber 21, the first water passage chamber 31, and the second water passage chamber 41 are sequentially communicated. In this way, the water inlet device 20 can supply water directly to the water outlet device (such as the overhead shower mounted on the second structural member 40) through the first structural member 30 and the second structural member 40. The height/angle adjustment process does not affect the water path communication, and the product features a more concise and elegant appearance and a stronger sense of technological sophistication.

Furthermore, an upper end of a front side of the water inlet device 20 is provided with a first rotary shaft portion 22, and the first rotary shaft portion 22 is in communication with the first water diversion chamber 21. Upper and lower ends of the first structural member 30 are respectively provided with a second rotary shaft portion 32 and a third rotary shaft portion 33, and the second rotary shaft portion 32 and the third rotary shaft portion 33 are both in communication with the first water passage chamber 31. A middle part of a back side of the second structural member 40 is provided with a fourth rotary shaft portion 42, and an upper end of a front side of the second structural member 40 is provided with a water outlet connector 43, and the water outlet connector 43 may be connected to the water outlet device such as the overhead shower, or configured to mount a ball joint seat of the overhead shower. The first rotary shaft portion 22 is rotatably connected with the second rotary shaft portion 32 in a dynamic sealing manner, and the third rotary shaft portion 33 is rotatably connected with the fourth rotary shaft portion 43 in a dynamic sealing manner. Thus, water is guided from the water inlet device 20 to the water outlet device through the water path: first water diversion chamber 21→first rotary shaft portion 22→second rotary shaft portion 32→first water passage chamber 31→third rotary shaft portion 33→fourth rotary shaft portion 43→second water passage chamber 41→water outlet connector 43, thereby supplying water to the water outlet device. Specifically, in actual products, if leakage prevention is required, at least one sealing ring may be provided at fitting positions between the rotary shaft portions.

Moreover, a second water diversion chamber 23, a water inlet chamber 24, and a water diversion connector 25 are further provided in the water inlet device 20. The water inlet chamber 24 is in communication with both the first water diversion chamber 21 and the second water diversion chamber 23 and is provided with a switching valve 100 therein. The switching valve 100 is configured to control communication of the water inlet chamber 24 with the first water diversion chamber 21 and the second water diversion chamber 23. For example, the water inlet chamber 24 may be in communication with only the first water diversion chamber 21, the water inlet chamber 24 may be in communication with only the second water diversion chamber 23, the water inlet chamber 24 may be in communication with both of the water diversion chambers, or the water inlet chamber 24 may be in communication with neither of the water diversion chambers. The water diversion connector 25 is in communication with the second water diversion chamber 23 and may be connected to a handheld shower via a water hose. Therefore, the water inlet device 20 of the present invention, serving as a three-way fitting, may flexibly switch water outlet modes through the switching valve 100 after being equipped with the switching valve 100. When the switching valve 100 controls the water inlet chamber 24 to be in communication with only the first water diversion chamber 21, water flows through the first structural member 30 and the second structural member 40 to the overhead shower, thereby satisfying full body showering. When the switching valve 100 controls the water inlet chamber 24 to be in communication with only the second water diversion chamber 23, water flows through the water diversion connector 25 to the handheld shower, allowing the user to rinse part of the body or clean the bathroom space. When the switching valve 100 controls the water inlet chamber 24 to be in communication with both of the water diversion chambers, the overhead shower and the handheld shower can discharge water at the same time, which is applicable to diverse showering scenarios. When the switching valve 100 controls the water inlet chamber 24 to be in communication with neither of the water diversion chambers, the entire water path is closed, so the flow of water is stopped. With this integrated water path switching design, there is no need to mount a separate diverter, thereby simplifying the piping layout in the bathroom space and reducing the mounting costs. Moreover, the user can quickly adjust the water outlet mode by operating the switching valve 100 with one hand during showering, thereby improving convenience and user experience. In this embodiment, the water inlet device 20 is designed in a split configuration as a main body 20*a* and a cover plate 20*b*, thereby facilitating the formation of a groove structure on the main body 20*a*. After the groove structure is covered by the cover plate 20*b*, the first water diversion chamber 21 and the second water diversion chamber 23 that are sealed and not in communication with each other are formed.

Additionally, the water inlet device 20 is further provided with a water inlet port 26, and a nut 200 is embedded in the water inlet port 26. For example, the water inlet device 20 may be an injection-molded part, and the nut 200 is integrally formed with the water inlet device 20 by a secondary injection molding process. An adapter 300 is sleeved on the water inlet port 26, and a limiting sleeve 400 for locking the adapter 300 is threadedly fitted in the nut 200. The adapter 300 may be connected to a water supply pipe pre-embedded in the wall, thereby allowing the product of the present invention to be suspended in midair. In this embodiment, the adapter 300 and the water inlet device 20 are further secured by a hex screw, thereby providing reinforcement and preventing wobbling.

Figure 9:
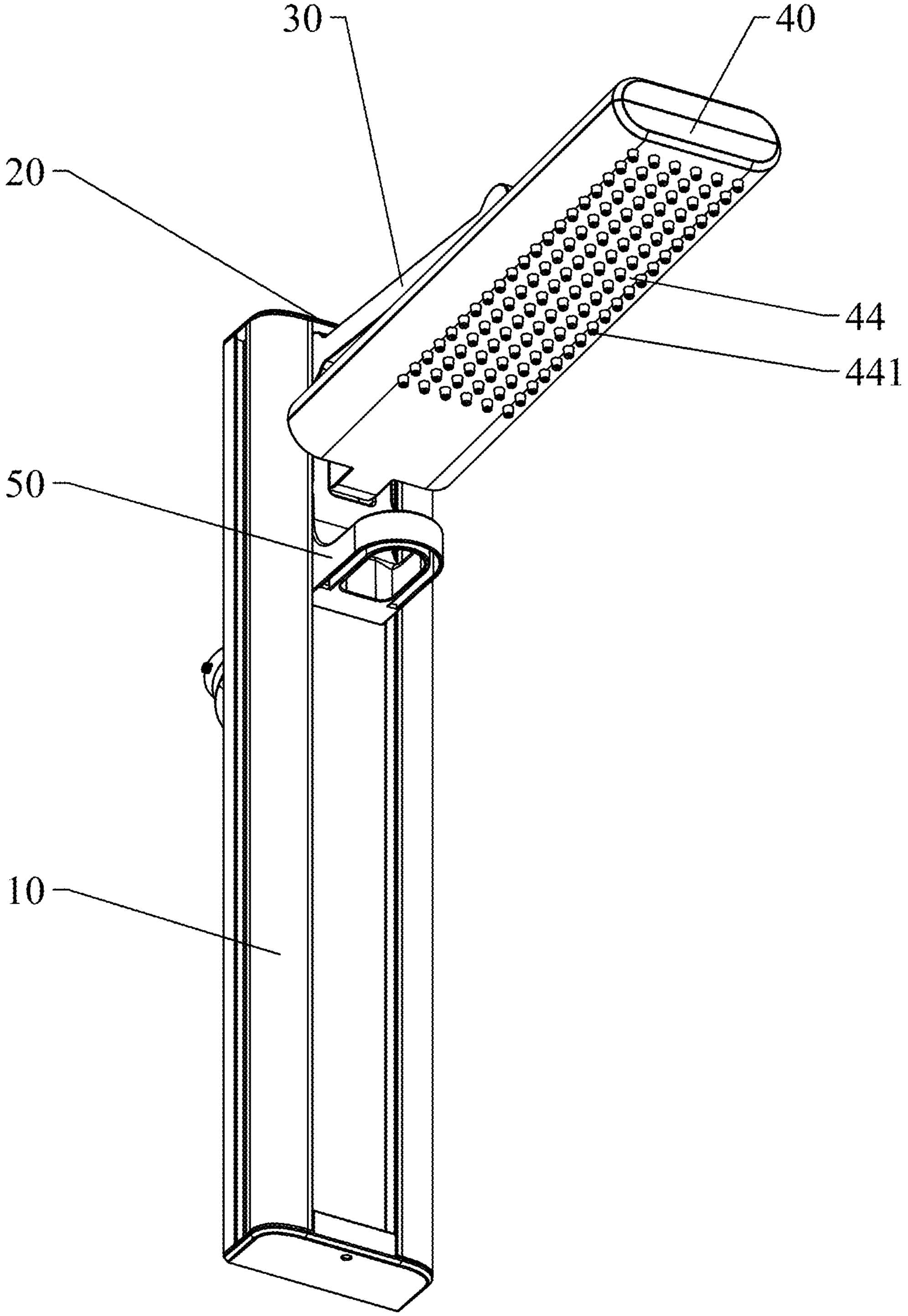
FIG. 9 is a three-dimensional view of a second embodiment of the present invention.
Figure 10:
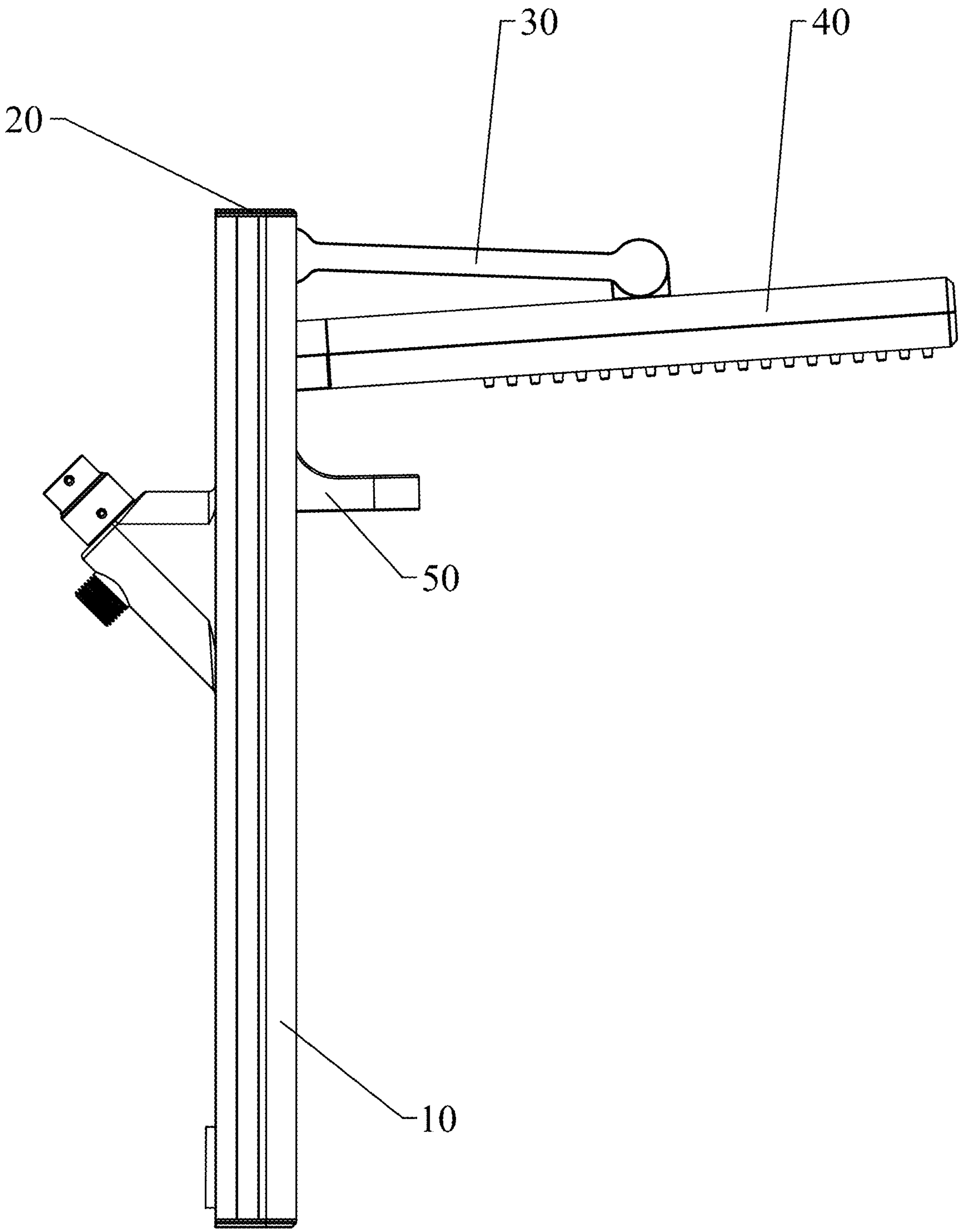
FIG. 10 is a side view of the second embodiment of the present invention.

Referring to FIG. 9 and FIG. 10, a second embodiment of the present invention is shown.

As previously described, the second structural member 40 of the second embodiment may serve directly as the water outlet device. Therefore, the second embodiment is different from the first embodiment mainly in that the front side of the second structural member 40 is not provided with the water outlet connector 43, and the entire front side is designed as a water outlet panel 44 having a plurality of water outlet posts 441. Thus, through the water path: first water diversion chamber 21→first rotary shaft portion 22→second rotary shaft portion 32→first water passage chamber 31→third rotary shaft portion 33→fourth rotary shaft portion 43→second water passage chamber 41→water outlet posts 441, the product can discharge water directly through the second structural member 40, enabling the user to take a shower conveniently.

The above embodiments and drawings do not limit the form and style of the product of the present invention. Any appropriate changes or modifications made by those skilled in the art should be regarded as falling within the scope of the present invention.

The invention claimed is:

1. A shower adjustment structure, comprising a slide rod, a water inlet device, a first structural member, a second structural member, and an operating member; wherein a guide portion is provided on the slide rod;

the water inlet device is mounted on the slide rod;

two ends of the first structural member are pivotally fitted to the water inlet device and the second structural member respectively;

the operating member is a manually operable mechanical member pivotally fitted to the second structural member and mounted on the slide rod by a guiding fit, with its motion trajectory constrained by the guide portion; and the operating member undergoes a posture change relative to the guide portion under the action of an external force to undo a locked state relative to the guide portion, wherein the locked state and unlocked state of the operating member are independent of water pressure.

2. The shower adjustment structure according to claim 1, wherein the guide portion is a constraint structure provided with guide rails therein, a middle part of the operating member is provided with protruding portions slidably fitted in the guide rails, and the protruding portion is fitted to two side walls of the guide rail.

3. The shower adjustment structure according to claim 1, wherein an elastic mechanism is disposed between a lower part of the operating member and a bottom wall of the guide portion, to lock the operating member when no external force is applied.

4. The shower adjustment structure according to claim 3, wherein a surface of an upper part of the operating member facing the guide portion is provided with anti-slip strips; and the lower part of the operating member extends away from the guide portion to form an operating portion.

5. The shower adjustment structure according to claim 3, wherein a surface of the lower part of the operating member facing the bottom wall of the guide portion is provided with a mounting groove, and a mounting post is provided in the mounting groove; and a movable sleeve and a spring for driving the movable sleeve to extend out of the mounting groove are slidably sleeved on the mounting post, and an end portion of the mounting post is connected with a locking piece for locking the movable sleeve.

6. The shower adjustment structure according to claim 1, wherein at least part of the second structural member forms a water outlet panel, or the second structural member is configured to mount and communicate the water outlet device.

7. The shower adjustment structure according to claim 6, wherein a first water diversion chamber is provided in the water inlet device, a first water passage chamber is provided in the first structural member, a second water passage chamber is provided in the second structural member, and the first water diversion chamber, the first water passage chamber, and the second water passage chamber are sequentially communicated.

8. The shower adjustment structure according to claim 7, wherein an upper end of a front side of the water inlet device is provided with a first rotary shaft portion, and the first rotary shaft portion is in communication with the first water diversion chamber; upper and lower ends of the first structural member are respectively provided with a second rotary shaft portion and a third rotary shaft portion, and the second rotary shaft portion and the third rotary shaft portion are both in communication with the first water passage chamber; a middle part of a back side of the second structural member is provided with a fourth rotary shaft portion, and an upper end of a front side of the second structural member is provided with a water outlet connector or the water outlet panel; and the first rotary shaft portion is rotatably connected with the second rotary shaft portion in a dynamic sealing manner, and the third rotary shaft portion is rotatably connected with the fourth rotary shaft portion in a dynamic sealing manner.

9. The shower adjustment structure according to claim 7, wherein a second water diversion chamber, a water inlet chamber, and a water diversion connector are further provided in the water inlet device; the water inlet chamber is in communication with both the first water diversion chamber and the second water diversion chamber and is provided with a switching valve therein, and the switching valve is configured to control communication of the water inlet chamber with the first water diversion chamber and the second water diversion chamber; and the water diversion connector is in communication with the second water diversion chamber.

10. The shower adjustment structure according to claim 7, wherein the water inlet device is further provided with a water inlet port, and a nut is embedded in the water inlet port; an adapter is sleeved on the water inlet port, and a limiting sleeve for locking the adapter is threadedly fitted in the nut; and the adapter and the water inlet device are secured by a hex screw.

* * * * *